US007725461B2

(12) United States Patent
Kandil et al.

(10) Patent No.: US 7,725,461 B2
(45) Date of Patent: May 25, 2010

(54) MANAGEMENT OF STATISTICAL VIEWS IN A DATABASE SYSTEM

(75) Inventors: Mokhtar Kandil, Toronto (CA); Alberto Lerner, New York, NY (US); Volker Gerhard Markl, San Jose, CA (US); Daniele Costante Zilio, Georgetown (CA); Calisto Paul Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 11/374,812

(22) Filed: Mar. 14, 2006

(65) Prior Publication Data

US 2007/0220058 A1 Sep. 20, 2007

(51) Int. Cl.
*G06F 7/00* (2006.01)
*G06F 17/30* (2006.01)
(52) U.S. Cl. ...................... 707/719; 707/722
(58) Field of Classification Search ............... None
See application file for complete search history.

(56) References Cited

U.S. PATENT DOCUMENTS

| 6,029,163 | A | * | 2/2000 | Ziauddin ............ 707/2 |
| 6,356,890 | B1 | * | 3/2002 | Agrawal et al. ............ 707/2 |
| 6,477,534 | B1 | | 11/2002 | Acharya et al. ............ 707/100 |
| 6,708,185 | B2 | | 3/2004 | Harris ............ 707/104.1 |
| 6,732,093 | B2 | | 5/2004 | Vally et al. ............ 707/4 |
| 6,947,927 | B2 | * | 9/2005 | Chaudhuri et al. ............ 707/3 |
| 6,971,091 | B1 | | 11/2005 | Arnold et al. |
| 7,020,797 | B2 | | 3/2006 | Patil |
| 7,401,094 | B1 | * | 7/2008 | Kesler ............ 707/102 |
| 2002/0161753 | A1 | | 10/2002 | Inaba et al. ............ 707/3 |
| 2003/0041042 | A1 | | 2/2003 | Cohen et al. |
| 2003/0088565 | A1 | | 5/2003 | Walter et al. ............ 707/6 |
| 2003/0158846 | A1 | | 8/2003 | Ikehata et al. ............ 707/7 |
| 2003/0200282 | A1 | * | 10/2003 | Arnold et al. ............ 709/219 |
| 2004/0030667 | A1 | | 2/2004 | Xu et al. ............ 707/1 |
| 2004/0162768 | A1 | | 8/2004 | Snyder et al. |
| 2004/0236762 | A1 | | 11/2004 | Chaudhuri et al. ............ 707/100 |
| 2005/0050041 | A1 | * | 3/2005 | Galindo-Legaria et al. ..... 707/4 |

OTHER PUBLICATIONS

Patent Cooperative Treaty, International Search Report, International Patent Application No. CA2007/000404, International file date Mar. 14, 2007, Applicant—International Business Machines Corporation, et al, 3 pages.

Acharya, Swarup et al., "Join Synopses for Approximate Query Answering", Proceedings of the SIGMOD Conference, 1999, pp. 275-286.

(Continued)

*Primary Examiner*—Greta L Robinson
*Assistant Examiner*—James J Wilcox
(74) *Attorney, Agent, or Firm*—Stephen J. Walder, Jr.; Terrence J. Carroll

(57) ABSTRACT

A method, computer program product, and system for managing statistical views in a database system are provided. The method, computer program product, and system provide for collecting data relating to optimization and execution of a workload in the database system and automatically generating a set of one or more statistical views based on the collected optimization and execution data.

19 Claims, 4 Drawing Sheets

OTHER PUBLICATIONS

Bruno, Nicolas et al., "Exploiting Statistics on Query Expressions for Optimization", Proceedings of the ACM SIGMOD Conference, Jun. 4-6, 2002, pp. 263-274.

Ioannidis, Yannis E. et al., "On the Propagation of Errors in the Size of Join Results", Proceedings of the ACM SIGMOD Conference, 1991, pp. 268-277.

Lehner, Wolfgang et al., "fAST Refresh using Mass Query Optimization", 17th International Conference on Data Engineering, ICDE, Apr. 2-6, 2001, 17 pages.

* cited by examiner

MANAGEMENT OF STATISTICAL VIEWS IN A DATABASE SYSTEM

FIELD OF THE INVENTION

The present invention relates generally to database systems. More particularly, the present invention is directed to management of statistical views in database systems.

BACKGROUND OF THE INVENTION

Relational database systems store data in tables that are organized into rows and columns. This allows large volumes of data to be stored and accessed efficiently and conveniently in response to user commands. User commands are typically submitted in the form of SQL (Structured Query Language) statements, such as SELECT, INSERT, DELETE, and UPDATE. Since SQL is a declarative language, i.e., it only specifies what data is to be accessed, not how that data is to be accessed, database systems include optimizers that formulate different plans for accessing data and evaluate those plans to select one for execution based on, for instance, costs or rules.

For cost-based optimizers, picking the "correct" plan, i.e., the least costly plan in terms of resources, time, or a combination of both, depends upon the statistics (i.e., information about the underlying data to be accessed) available to the optimizer. Database systems usually maintain some very basic statistics, such as size and column-data distribution of base tables. Using those basic statistics, the cost of certain operations, such as simple predicates ('col=value'), can be accurately estimated. The cost associated with some operations, however, are much more difficult to estimate. For example, the cardinality (i.e., the number of rows in the result set) for join operations is notoriously difficult to estimate. Additionally, once the cardinality for one operation is wrongly estimated, that error propagates to subsequent operations.

To improve optimizer performance, database administrators have the option of manually declaring views on statistics collected for various operations handled by the database system (i.e., statistical views). However, since the number of statistical views that can be declared for a database system could be unlimited, it would be impractical to manually declare and maintain all of those views as the costs will quickly outweigh the benefits. For example, additional storage will be needed to store the numerous statistical views. In addition, the costs involved in keeping the statistical views up-to-date may be too high. Moreover, the time it would take an optimizer to search through all of the statistical views when compiling an execution plan may be too much of an overhead.

Accordingly, there is a need for an invention that not only automates the process of generating statistical views, but also balances the need to minimize optimizer errors with the costs associated with generating and maintaining statistical views.

SUMMARY OF THE INVENTION

A method, computer program product, and system for managing statistical views in a database system are provided. The method, computer program product, and system provide for collecting data relating to optimization and execution of a workload in the database system and automatically generating a set of one or more statistical views based on the collected optimization and execution data, wherein the workload comprises a plurality of sub-expressions and each of the one or more statistical views corresponds to one of the plurality of sub-expressions.

DETAILED DESCRIPTION

The present invention relates generally to database systems and more particularly to management of statistical views in database systems. The following description is presented to enable one of ordinary skill in the art to make and use the invention and is provided in the context of a patent application and its requirements. Various modifications to the preferred implementations and the generic principles and features described herein will be readily apparent to those skilled in the art. Thus, the present invention is not intended to be limited to the implementations shown, but is to be accorded the widest scope consistent with the principles and features described herein.

Figure 1:
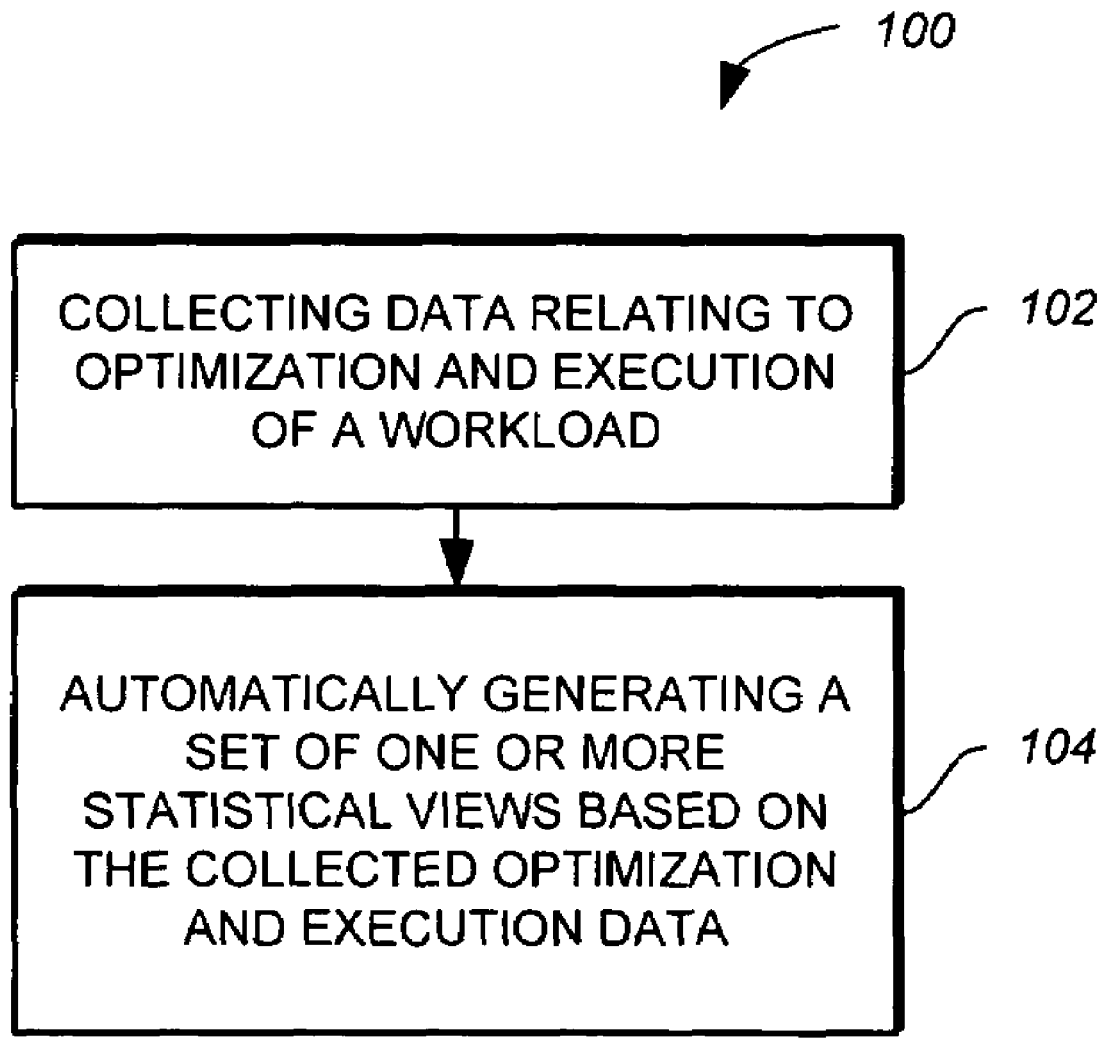
FIG. 1 is a process flow of a method for managing statistical views in a database system according to an aspect of the invention.

FIG. 1 depicts a process 100 for managing statistical views in a database system according to an aspect of the invention. At 102, data relating to optimization and execution of a workload in the database system is collected. A workload is a set of commands, e.g., SQL (Structured Query Language) statements, logically grouped together to achieve a certain result. Each workload comprises a plurality of sub-expressions, which can be a whole or a part of a SQL statement. Data relating to optimization and execution of a workload may include, for example, the cardinality of a sub-expression (e.g., a join operation) estimated by an optimizer in the database system and the actual cardinality of the result set obtained from execution of the sub-expression.

At 104, a set of one or more statistical views are automatically generated based on the collected optimization and execution data. Each of the one or more statistical views corresponds to one of the plurality of sub-expressions in the workload. A statistical view contains statistics (e.g., cardinality, number of unique values, most frequent value, etc.) relating to the results of a sub-expression. A materialized view of the sub-expression, in contrast, includes the actual results of the sub-expression.

In one implementation, the number of statistical views generated is less than the number of sub-expressions in the workload. For example, statistical views may only be generated for those sub-expressions in which the optimizer committed an error, such as an incorrect cardinality estimate, which may have been the result of an invalid predicate-dependency assumption, a large n-way join operation, etc. Statistical views may also be generated for those sub-expressions that the optimizer often encounters or has difficulties with (e.g., needs more time to compute estimates). This way, the costs associated with generating statistical views are balanced against the need to minimize optimizer errors.

Figure 2:
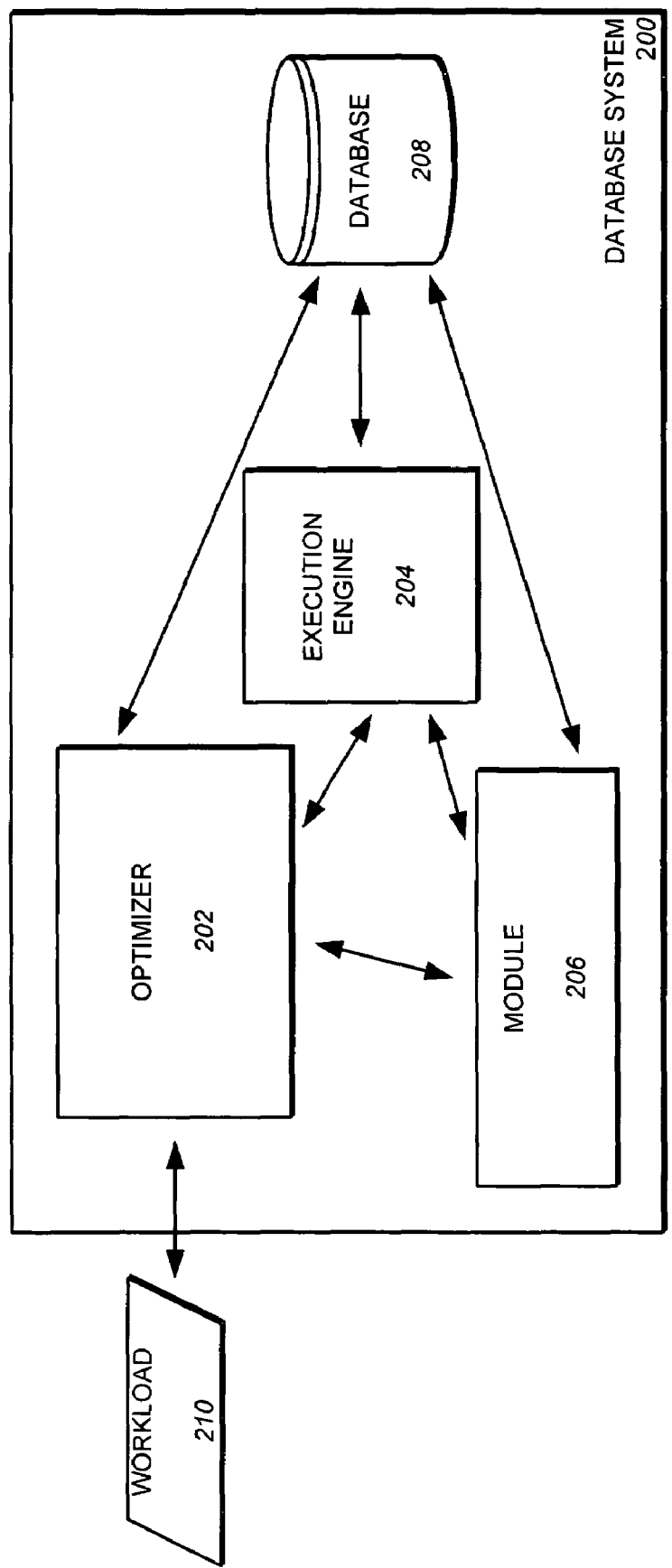
FIG. 2 illustrates a database system in accordance with one implementation of the invention.

Shown in FIG. 2 is a database system 200 in accordance with an embodiment of the invention. Database system 200 comprises an optimizer 202, an execution engine 204, a module 206, and a database 208. Database system 200 may include additional databases and components (not shown) in other embodiments.

A workload 210 is received by optimizer 202 for processing. Workload 210 may be submitted by a client application (not shown) connected to database system 200 via a network (not shown). For each SQL statement in workload 210, optimizer 202 will formulate execution plans and select one of those plans for execution by execution engine 204. Statistics relating to the optimization and execution of workload 210 are then collected by module 206.

Based on the collected optimization and execution data, module 206 will automatically generate a set of one or more statistical views. Each statistical view corresponds to one of a plurality of sub-expressions in workload 210. These statistical views may be stored in a catalog (not shown) in database 208. In other embodiments, module 206 may be part of optimizer 202.

To balance the costs associated with generating and maintaining statistical views with the need to minimize optimizer errors, module 206 may not automatically generate a statistical view for each sub-expression in workload 210. For instance, statistical views may only be generated for those sub-expressions in which an error was committed by optimizer 202. Module 206 could detect the error by comparing the optimization statistics to the execution statistics.

Module 206 can also reduce the number of statistical views maintained in database system 200 by checking for and eliminating duplicate statistical views. A statistical view is a duplicate of another statistical view when the sub-expressions corresponding to the two statistical views are identical or when one of the sub-expressions is a prefix of the other sub-expression.

This redundancy check may be performed after each new set of one or more statistical views is generated or in batches, i.e., after several new sets of one or more statistical views are generated. In determining whether a statistical view is a duplicate, module 206 may consider statistical views that have already been generated and are being maintained in a catalog in database 208. Rather than deleting the newly created statistical view, module 206 may eliminate the pre-existing statistical view since the statistics in the pre-existing statistical view may be stale.

Reductions in the number of statistical views can also be made by generalizing very similar statistical views into one generalized statistical view. A generalized statistical view is one that represents several sub-expressions $EX_1, EX_2, \ldots, EX_n$ and derives from a sub-expression $EX_G$ that can be reduced to any sub-expression $EX_i$, where i=1 to n, by the application of a known operation. For example, suppose a statistical view is generated for each of the following sub-expressions written in pseudo-SQL code:

SELECT C2 FROM T1 WHERE Condition and C1=5
GROUP BY C3 [1]

SELECT C2 FROM T1 WHERE Condition and C1=7
GROUP BY C3 [2]

Since sub-expressions [1] and [2] only differ by a constant, it may be advantageous to generalize the statistical views based on those sub-expressions into one statistical view that is independent of the constants. This generalized statistical view would represent the following sub-expression, also written in pseudo-SQL code:

SELECT C2, C1 FROM T1 WHERE Condition
GROUP BY C3, C1 [3]

The statistical views corresponding to sub-expressions [1] and [2] can then be deleted. The decision to generalize statistical views has to be balanced with the loss of exact statistics for the constants, which may be important. As a result, a lookup of the histograms associated with the underlying tables may be helpful in deciding whether the generalization is beneficial or not and whether the non-generalized statistical views should be maintained.

Similar statistical views can also replaced by merging them into one combined statistical view that covers all of the underlying sub-expressions. For instance, the statistical views generated for the following sub-expressions [4] and [5], written in pseudo-SQL code, can be merged into one statistical view represented by sub-expression [6], also written in pseudo-SQL code, below:

SELECT C2 FROM T1 WHERE Condition1 and
C1=5 GROUP BY C3 [4]

SELECT C4 FROM T1 WHERE Condition2 and
C1=7 GROUP BY C3 [5]

SELECT C4, C2, C1 FROM T1 WHERE Condition1
or Condition 2 GROUP BY C3, C1 [6]

As with eliminating duplicate statistical views, generalizing and merging of statistical views can be done in batches or after a set of one or more statistical views are generated. In addition, module 206 may perform all of these purging steps together. Further, since there may be pre-existing statistical views in database system 200, the views generalized and/or merged may be newly generated, pre-existing, or a combination of both.

Figure 3:
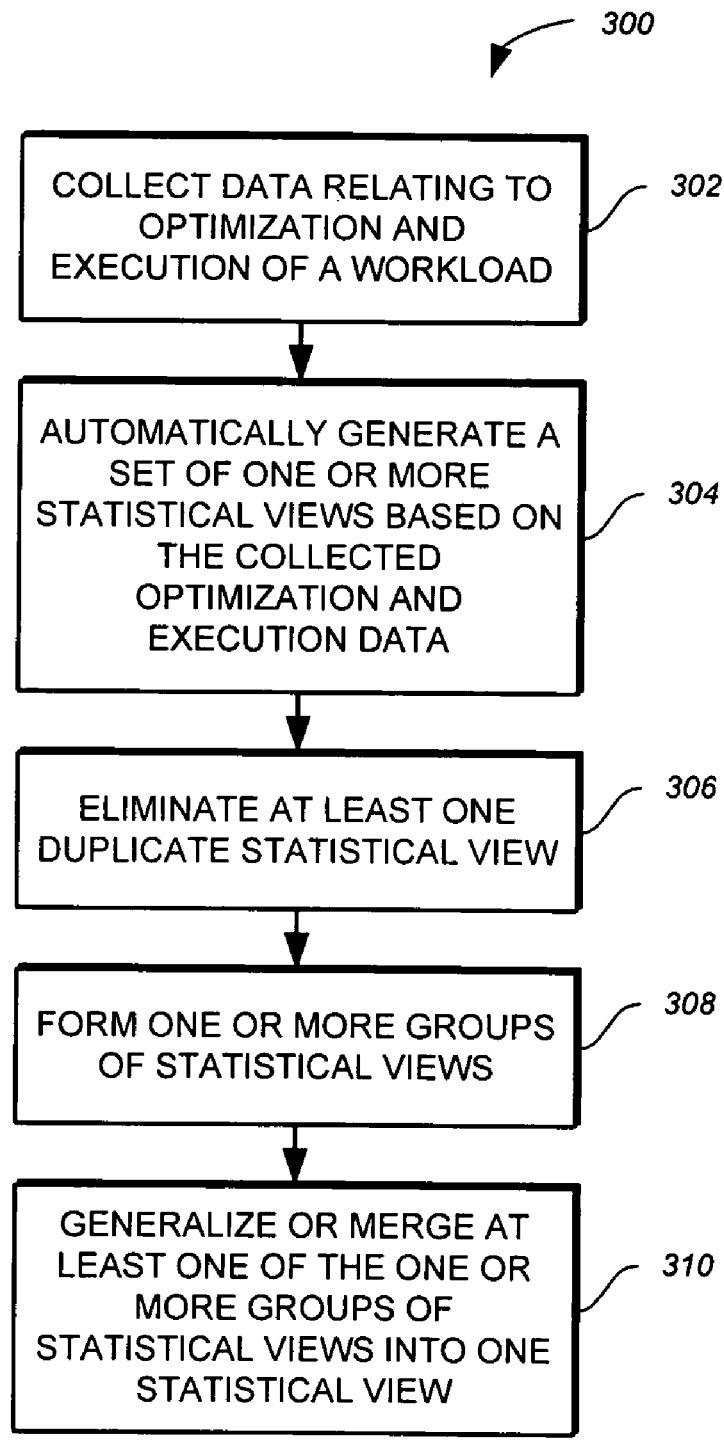
FIG. 3 depicts a flowchart of a method for managing statistical views in a database system according to an embodiment of the invention.

FIG. 3 illustrates a process 300 for managing statistical views in a database system according to another aspect of the invention. At 302, data relating to optimization and execution of a workload is collected. A set of one or more statistical views is automatically generated at 304 based on the collected optimization and execution data. At least one duplicate statistical view is then eliminated (306).

One or more groups of statistical views are formed at 308. In the embodiment, each of the one or more groups comprises at least two statistical views. Each of the at least two statistical views may be selected from the set of one or more statistical views or from a pre-existing set of one or more statistical views. At least one of the one or more groups of statistical views is then generalized or merged into one statistical view (310).

In addition to statistical views, database system 200 may also include materialized views. By collecting statistics on the usage of statistical and materialized views in database system 200, module 206 may be able to find equivalences between materialized views and statistical views and potentially convert a statistical view into a materialized view and vice versa. For example, if a statistical view is "hot" (i.e., often used by optimizer 202), it may be worthwhile for module 206 to convert that statistical view into a materialized view with ready and available result data. The opposite may also be true; a materialized view that is rarely used may be converted into a statistical view in order to save space while keeping the statistical data.

The invention can take the form of an entirely hardware embodiment, an entirely software embodiment, or an embodiment containing both hardware and software elements. In one aspect, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain or store, the program for use by or in connection with the instruction execution system, apparatus, or device.

Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk—read-only memory (CD-ROM), and compact disk—read/write (CD-R/W).

Figure 4:
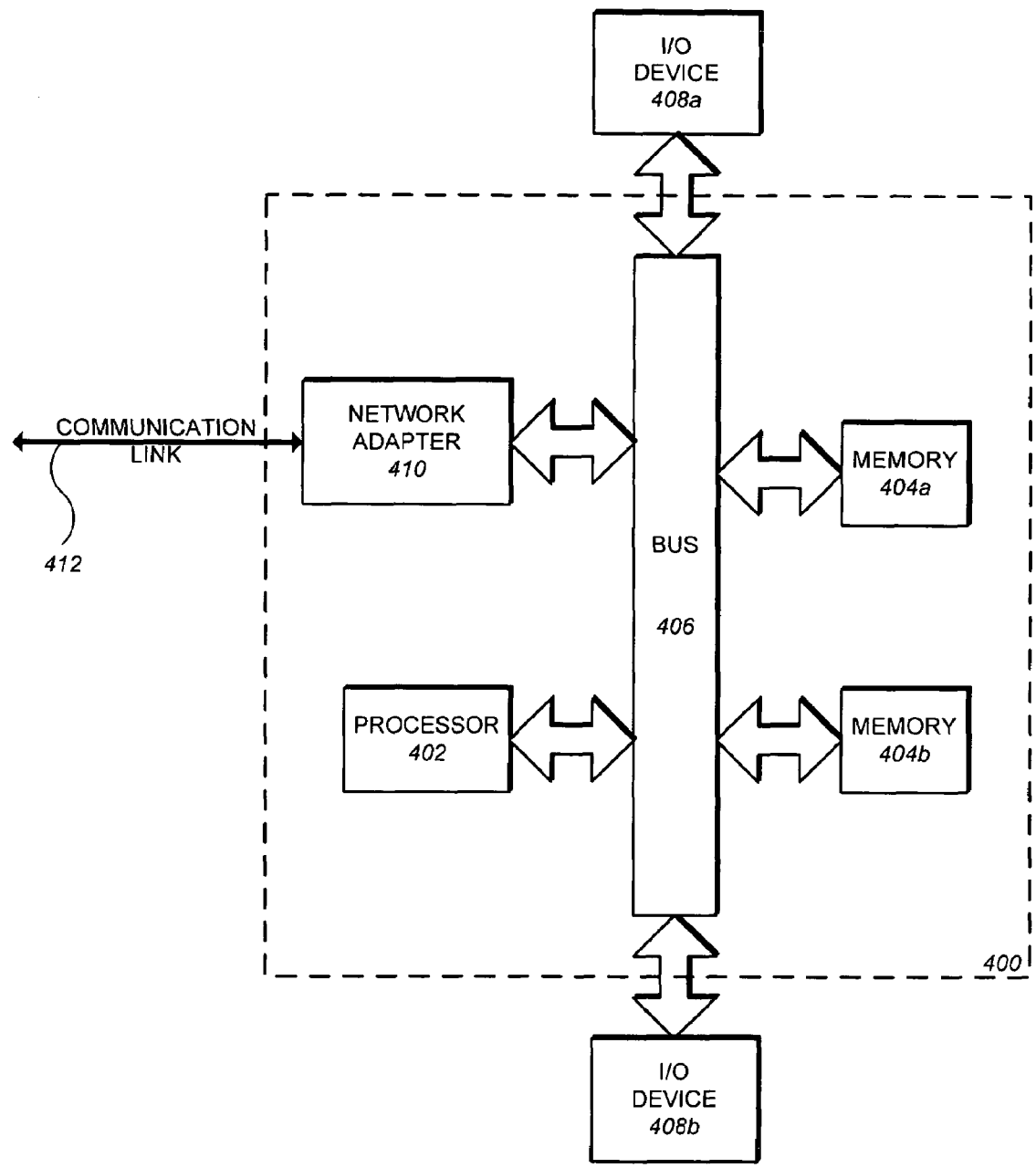
FIG. 4 is a block diagram of a data processing system with which embodiments of the present invention can be implemented.

Depicted in FIG. 4 is a data processing system 400 suitable for storing and/or executing program code. Data processing system 400 includes a processor 402 coupled to memory elements 404a-b through a system bus 406. In other embodiments, data processing system 400 may include more than one processor and each processor may be coupled directly or indirectly to one or more memory elements through a system bus.

Memory elements 404a-b can include local memory employed during actual execution of the program code, bulk storage, and cache memories that provide temporary storage of at least some program code in order to reduce the number of times the code must be retrieved from bulk storage during execution. As shown, input/output or I/O devices 408a-b (including, but not limited to, keyboards, displays, pointing devices, etc.) are coupled to data processing system 400. I/O devices 408a-b may be coupled to data processing system 400 directly or indirectly through intervening I/O controllers (not shown).

In the embodiment, a network adapter 410 is coupled to data processing system 400 to enable data processing system 400 to become coupled to other data processing systems or remote printers or storage devices through communication link 412. Communication link 412 can be a private or public network. Modems, cable modems, and Ethernet cards are just a few of the currently available types of network adapters.

Various implementations for management of statistical views in database systems have been described. Nevertheless, one of ordinary skill in the art will readily recognize that various modifications may be made to the implementations, and any variations would be within the spirit and scope of the present invention. For example, the above-described process flows are described with reference to a particular ordering of process actions. However, the ordering of many of the described process actions may be changed without affecting the scope or operation of the invention. Accordingly, many modifications may be made by one of ordinary skill in the art without departing from the spirit and scope of the following claims.

What is claimed is:

1. A method of managing statistical views in a database system, the method comprising:
    collecting data relating to optimization and execution of a workload in the database system, the workload comprising a plurality of sub-expressions for which data relating to optimization and execution of the workload is collected; and
    automatically generating, for a subset of the plurality of sub-expressions less than a total number of sub-expressions in the workload, a set of one or more statistical views based on the collected optimization and execution data, each of the one or more statistical views corresponding to one of the sub-expressions in the subset of the plurality of sub-expressions, wherein the number of statistical views generated is less than the total number of sub-expressions in the workload for which data relating to optimization and execution of the workload is collected.

2. The method of claim 1, further comprising:
    eliminating at least one duplicate statistical view from the set of one or more statistical views.

3. The method of claim 1, further comprising:
    forming one or more groups of statistical views, each of the one or more groups comprising at least two statistical views from the set of one or more statistical views; and
    generalizing at least one of the one or more groups of statistical views into one statistical view.

4. The method of claim 1, further comprising:
    forming one or more groups of statistical views, each of the one or more groups comprising at least two statistical views from the set of one or more statistical views; and
    merging at least one of the one or more groups of statistical views into one statistical view.

5. The method of claim 1, wherein the database system comprises a pre-existing set of one or more statistical views and the method further comprises:
    eliminating at least one duplicate statistical view, the at least one duplicate statistical view being from the set of one or more statistical views or the pre-existing set of one or more statistical views.

6. The method of claim 1, wherein the database system comprises a pre-existing set of one or more statistical views and the method further comprises:
    forming one or more groups of statistical views, each of the one or more groups comprising at least two statistical views, the at least two statistical views being from the set of one or more statistical views, the pre-existing set of one or more statistical views, or both; and
    generalizing at least one of the one or more groups of statistical views into one statistical view.

7. The method of claim 1, wherein the database system comprises a pre-existing set of one or more statistical views and the method further comprises:
    forming one or more groups of statistical views, each of the one or more groups comprising at least two statistical views, the at least two statistical views being from the set of one or more statistical views, the pre-existing set of one or more statistical views, or both; and
    merging at least one of the one or more groups of statistical views into one statistical view.

8. The method of claim 1, wherein the one or more statistical views are only generated for sub-expressions in which an optimizer committed an error.

9. The method of claim 8, wherein the error is an incorrect cardinality estimate made by the optimizer.

10. The method of claim 8, wherein the error is detected by comparing optimization statistics to execution statistics.

11. The method of claim 1, wherein the one or more statistical views are generated for only sub-expressions that an optimizer encounters often.

12. The method of claim 2, wherein a first statistical view in the one or more statistical views is a duplicate statistical view of a second statistical view in the one or more statistical views when a first sub-expression associated with the first statistical view is identical to a second sub-expression associated with the second statistical view.

13. The method of claim 2, wherein a first statistical view in the one or more statistical views is a duplicate statistical view of a second statistical view in the one or more statistical views when a first sub-expression associated with the first statistical view is a prefix of a second sub-expression associated with the second statistical view.

14. The method of claim 1, further comprising:
converting at least one statistical view of the one or more statistical views to a materialized view with available result data.

15. The method of claim 14, wherein the at least one statistical view is a statistical view that is often utilized by an optimizer.

16. The method of claim 1, further comprising:
generating one or more materialized views of the workload; and
converting at least one materialized view, of the one or more materialized views, to a statistical view.

17. The method of claim 16, wherein the at least one materialized view is a materialized view that is rarely used by an optimizer.

18. An apparatus for managing statistical views in a database system, the apparatus comprising:
a processor; and
a memory coupled to the processor, wherein the memory comprises program code which, when executed by the processor, causes the processor to:
collect data relating to optimization and execution of a workload in the database system, the workload comprising a plurality of sub-expressions for which data relating to optimization and execution of the workload is collected; and
automatically generate, for a subset of the plurality of sub-expressions less than a total number of sub-expressions in the workload, a set of one or more statistical views based on the collected optimization and execution data, each of the one or more statistical views corresponding to one of the sub-expressions in the subset of the plurality of sub-expressions, wherein the number of statistical views generated is less than the total number of sub-expressions in the workload for which data relating to optimization and execution of the workload is collected.

19. A computer program product comprising a computer readable medium having a computer readable program stored thereon, wherein the computer readable program, when executed on a computing device, causes the computing device to:
collect data relating to optimization and execution of a workload in a database system, the workload comprising a plurality of sub-expressions for which data relating to optimization and execution of the workload is collected; and
automatically generate, for a subset of the plurality of sub-expressions less than a total number of sub-expressions in the workload, a set of one or more statistical views based on the collected optimization and execution data, each of the one or more statistical views corresponding to one of the sub-expressions in the subset of the plurality of sub-expressions, wherein the number of statistical views generated is less than the total number of sub-expressions in the workload for which data relating to optimization and execution of the workload is collected.

* * * * *

UNITED STATES PATENT AND TRADEMARK OFFICE
CERTIFICATE OF CORRECTION

PATENT NO. : 7,725,461 B2  Page 1 of 1
APPLICATION NO. : 11/374812
DATED : May 25, 2010
INVENTOR(S) : Kandil et al.

It is certified that error appears in the above-identified patent and that said Letters Patent is hereby corrected as shown below:

On the Title page, under (75) Inventors: please delete "Daniele Costante Zilio" and insert --Daniel Costante Zilio--

Signed and Sealed this

Thirteenth Day of July, 2010

David J. Kappos
*Director of the United States Patent and Trademark Office*